United States Patent [19]

Duckworth

[11] Patent Number: 4,476,841

[45] Date of Patent: Oct. 16, 1984

[54] VAPOR INJECTION SYSTEM FOR INTERNAL COMBUSTION ENGINE

[76] Inventor: Charles E. Duckworth, 7601 Biscayne Blvd., Miami, Fla. 33138

[21] Appl. No.: 499,459

[22] Filed: May 31, 1983

[51] Int. Cl.³ .......................................... F02M 31/00
[52] U.S. Cl. .................................... 123/557; 123/523; 123/522
[58] Field of Search ............... 123/522, 523, 524, 525, 123/575, 576, 578, 557, 552

[56] References Cited

U.S. PATENT DOCUMENTS

| | | | |
|---|---|---|---|
| 2,150,764 | 3/1939 | Fauneau | 123/525 |
| 2,390,979 | 12/1945 | Young | 123/552 |
| 2,461,411 | 2/1949 | Cummings | 123/522 |
| 2,550,582 | 9/1953 | Green | 123/522 |
| 2,742,886 | 4/1956 | McPherson | 123/522 |
| 3,364,911 | 1/1968 | Baudry | 123/575 |
| 3,851,633 | 12/1974 | Shih | 123/578 |
| 4,068,639 | 1/1978 | Cook | 123/525 |
| 4,074,666 | 2/1978 | Pierce | 123/522 |
| 4,351,301 | 9/1982 | Allen | 123/557 |
| 4,398,523 | 8/1983 | Henson | 123/557 |

Primary Examiner—Ronald H. Lazarus
Attorney, Agent, or Firm—C. Lamont Whitham

[57] ABSTRACT

An improved fuel injection system for a spark ignition multicylinder internal combustion engine includes a fuel heater tank for vaporizing liquid fuel and accumulating a supply of fuel vapors. The fuel vapors are pressurized by an air pump driven by the internal combustion engine, and a plurality of injection nozzles are located in the intake manifold at positions as close to the intake valves as possible. A control valve mechanism supplies fuel vapors accumulated in the fuel heater tank to each of the nozzles.

5 Claims, 6 Drawing Figures

VAPOR INJECTION SYSTEM FOR INTERNAL COMBUSTION ENGINE

FIELD OF THE INVENTION

The present invention generally relates to fuel injection systems for internal combustion engines, and more particularly to an improved injection system wherein fuel vapors are first generated and then directly injected into the intake manifold of the internal combustion engine under controlled conditions.

BACKGROUND OF THE INVENTION

Fuel injection was invented for the diesel or compression ignition engine and in fact is necessary for the proper operation for that type of internal combustion engine. As used in a diesel engine, a fuel injection system is characterized by a mechanically driven pump and distributer which supplies fuel oil under pressure to the individual injection nozzles. The system is remarkably reliable but quite expensive to build and maintain. The otto cycle or spark ignition engine on the other hand has in the past almost exclusively used a carburetor for supplying volatilized fuel to the intake manifold of the engine. While not as reliable as the mechanical fuel injection system of a typical diesel engine, the carburetor is neither expensive to manufacture or maintain. Until the past decade when fuel economy became of increasing importance in the design and operation of automobiles, fuel injection systems for spark ignition engines were to be found generally only on high performance race cars and certain exotic imported automobiles. However, the cycles of limited availability and increasing prices for gasoline have made fuel injection and its advantages of increased fuel economy the fuel induction system of choice for all but a few of the automobiles now being manufactured.

The fuel injection systems which have been developed for modern spark ignition engines have been a compromise in performance and cost of manufacture. While mechanical fuel injection systems are known for spark ignition engines, because of their expense to manufacture and maintain, such systems have not been favored. Instead, the predominate choice is one of the several electronic fuel injection systems that have been recently developed. These systems typically use solenoid injector nozzles which respond to pulses from a microprocessor programmed to properly control the timing and duration of injector opening. Not only are these injector nozzles expensive to manufacture because of the very close tolerances required, they are also difficult to regulate because of differing operating characteristics exhibited by individual nozzles. One attempt to avoid these problems has been the development of so-called throttle body fuel injection which uses only one or at most two injector nozzles in the throttle body of the intake manifold. This is an attempt to combine the advantages of computer controlled solenoid injector nozzles with the economy and simplicity of a carburetor. Unfortunately, this approach compromises the superior fuel distribution characteristic of earlier fuel injection systems that led to their adoption for reasons of the fuel economies these systems were capable of producing.

SUMMARY OF THE INVENTION

It is therefore an object of the present invention to provide a superior fuel injection system for spark ignition engines.

It is another object of the invention to provide a fuel injection system that requires neither the expensive mechanical pump and distributer nor the complex and difficult to regulate solenoid injector nozzles of prior fuel injection systems.

The objects of the invention are accomplished by providing a fuel injection system wherein the fuel is first vaporized and then injected in the intake manifold adjacent the intake valves in a multicylinder internal combustion engine. Preferrably the fuel used is gasoline which is highly volatile, but other volatile fuels which are more or less volatile may be used. Fuel heater tanks are used to vaporize the liquid fuel. While it is possible to use any heat source to heat the liquid fuel including for example electric heaters, the preferred embodiment heats the fuel using the engine coolant which is circulated through the heater tank. The liquid fuel level in the tank is maintained at approximately 30% of the volume of the tank by means of a float valve, and a copper coil is immersed in the liquid fuel and engine coolant is circulated through the copper coil to transfer heat to the liquid fuel. This tank design can be simplified by eliminating the copper coil and providing a separate compartment at the bottom of the heater tank through which the engine coolant is circulated. In an actual embodiment, both the separate compartment and the copper coil have been used to provide maximum heat transfer and thereby enhance the vaporization of the fuel. The air space above the liquid fuel is pressurized by an air pump. The air pump may be a separate pump driven by a crankshaft pulley like those in general use in emissions control systems; however, in a preferred implementation of the invention a separate air pump is not used. Instead, using the principles taught in my prior patent number 4,068,628, I have converted a standard V8 engine to a balanced V6 engine by making modifications to the intake manifold so that two of the cylinders are isolated from the other six. These two cylinders are now used as an air pump by connecting air lines to the spark plug openings. The air pressure from these two cylinders is controlled by an air pressure regulator and supplied to the fuel heater tank. The pressurized fuel heater tank produces an abundant amount of fuel vapors which are supplied to the intake manifold by means of one or more control valves which may be electrically, pneumatically or mechanically actuated. In an actual implementation of the invention, pneumatically actuated valves were used because of their inherent reliablity and low cost. Obviously, a more refined version of the invention could advantageously employ electrically actuated valves controlled by a microprocessor. The injectors themselves are very simple being simply nozzles mounted in the intake manifold adjacent each of the intake valves. The amount of fuel supplied to each of the cylinders is therefore a function of the control valve opening and the intake manifold pressure. The system is inherently regulated and the expensive mechanical and electrically operated parts have been eliminated.

BRIEF DESCRIPTION OF THE DRAWINGS

The foregoing and other objects, advantages and aspects of the invention will be better understood from the following detailed description of an actual implementation with reference to the accompanying drawings, in which.

DESCRIPTION OF A PREFERRED EMBODIMENT

Figure 1:
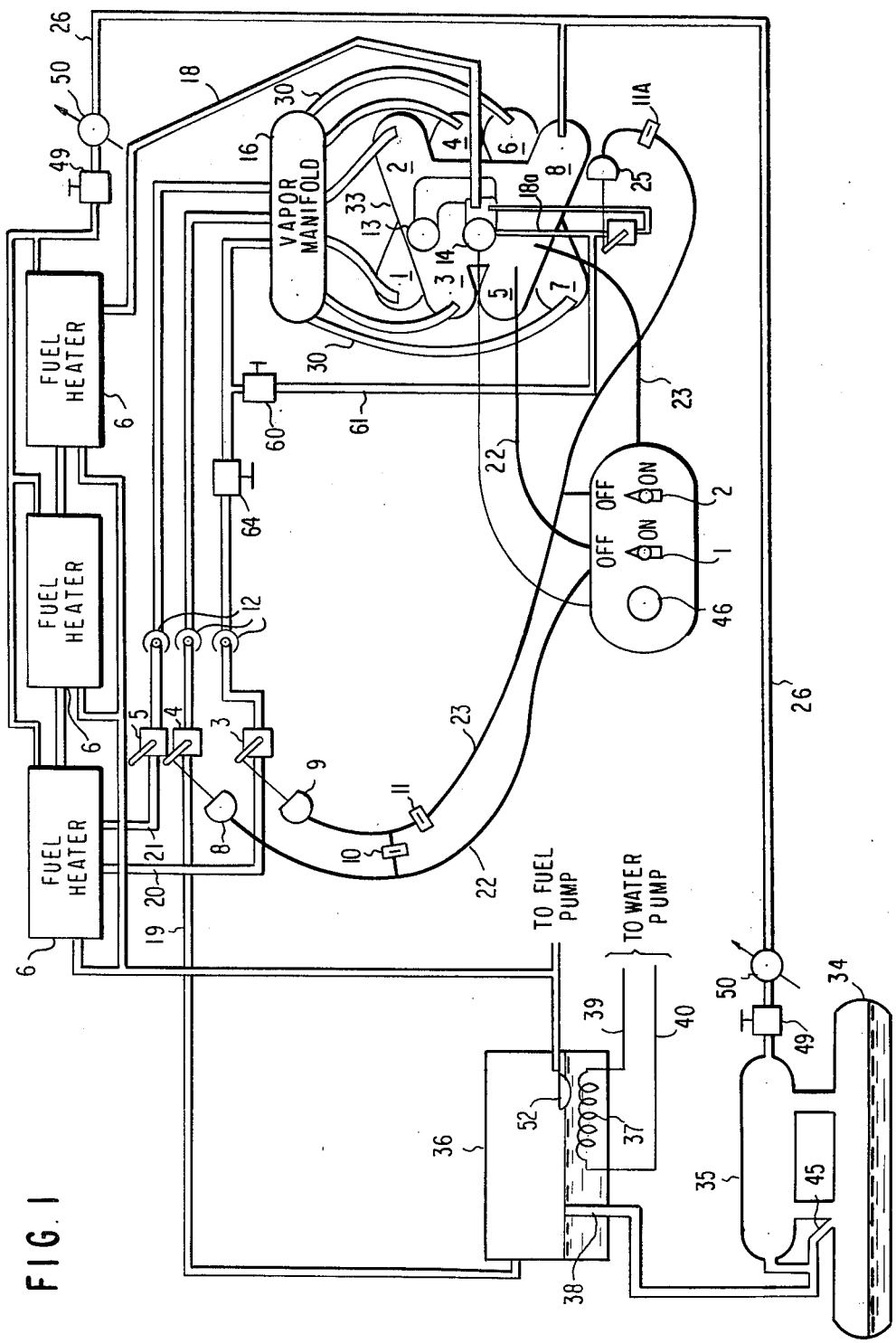
FIG. 1 is a schematic diagram of the overall fuel injection system as actually built.

Referring now to the drawings, and more particularly to FIG. 1, the vapor injection system according to the invention as actually implemented includes an on/off control valve 1 which is manually operated for the control of pneumatic actuators 8 and 9. Actuator 8 operates valves 4 and 5 which operate in unison by means of a connecting rod 7. Actuator 9 operates the single valve 3. The pneumatic actuators 8 and 9 operate on carburetor vacuum supplied by vacuum line 22 when on/off valve 1 is turned to the on position and a second on/off valve 2 is turned to the off position. When the engine is idling and the throttle valve is closed, the carburetor vacuum is inactive on actuator 8 causing valves 4 and 5 to return to a closed postion. Actuator 9 also operates on carburetor vacuum line 22, but this actuator will not return to a closed position unless a small pin hole is made in check valve 10 or 11. Such a pin hole should be made in the check valve on the vacuum side of actuator 9. This pin hole lets atmospheric air enter the vacuum line and releases the actuator to close valve 3. Thus, when the on/off valve 1 is on and the on/off valve 2 is off, carburetor vacuum controls the opening of valves 3, 4 and 5 that permit the flow of fuel vapors in lines 19, 20 and 21 into a common vapor manifold 16. A plurality of separate vapor injector lines 30 eminate from the vapor manifold 16 and are coupled to injection ports in the engine intake manifold 33 at locations as close as possible to the intake valves of cylinders 1, 2, 3, 4, 6, and 7 of a conventional V8 engine. The fuel vapors in line 19 are supplied from a heater tank 36 located at the rear of the automobile adjacent to the fuel tank 34, while the fuel vapors in lines 20 and 21 are supplied from the last of three heater tanks 6 located in the engine compartment of the automobile. Ball check valves 12 are interposed in lines 19, 20 and 21 between the vapor manifold 16 and corresponding valves 4, 3 and 5, respectively. The opening and closing of these valves 3, 4 and 5 are therefore synchronous and responsive to engine demand for admission of fuel vapors to the intake manifold. When decelerating, valves 3, 4 and 5 close in a synchronous manner. With on/off valve 2 on, intake manifold pressure on line 23 intercedes in the operation of actuator 9 by the closing of check valve 10 so that during deceleration, valve 3 will remain open even though valves 4 and 5 close.

On/off valve 2 controls the operation of pneumatic actuator 25 as well as the operation of pneumatic actuator 9. It will be observed that a line 18 connected to the first heater tank 6 leads to the top of the float bowl of carburetor 14 and then to the inlet side of valve 17. When on/off valve 2 is in the off position and the engine is idling, the engine operates on liquid fuel supplied by the conventional low speed metering system of carburetor 14. The only modification that has been made is that the float bowl is not vented to atmosphere and the air space above the fuel level is pressurized to the pressure of the heater tank 6. Since the float bowl is not vented to atmosphere, the pressure from the heater tank 6 is required for proper venturi fuel discharge operation when both on/off valves 1 and 2 are in the off position and the engine is running on liquid fuel supplied by the carburetor 14. This has the advantage of making the engine operation less susceptible to atmospheric changes such as may be encountered in mountainous terrain.

When turned to the on position, on/off valve 2 permits the low pressure of the intake manifold supplied by vacuum line 23 to operate actuators 9 and 25. Actuator 9 holds valve 3 open permitting fuel vapors to flow in the vapor manifold 16 through line 20. At the same time, actuator 25 opens valve 17 permitting fuel vapors in line 18 from the float bowl of carburetor 14 to flow through line 18A into the carburetor low speed system thereby reducing the flow of liquid fuel through the low speed system. Line 18A intersects the idle passage between the low speed jet and the fuel-air adjustment screw in carburetor 14. The admission of pressurized vapors through line 18A causes a cessation of liquid fuel flow from the float bowl of the carburetor 14 so that the engine idles on fuel vapors rather than liquid fuel. This is effective when the engine is at operating temperature and sufficient fuel vapors are available. However, when the engine is cold, on/off valve 2 should be turned to the off position to cause the pneumatic actuator 9 to become atmospheric through the pin hole in the check valve 11. Spring bias (not shown) on the actuator will force the actuator arm to close valve 3. At the same time, actuator 25, which also operates on the same vacuum source line 23, will become atmospheric through a pin hole in check valve 11A. Spring bias will force the actuator arm to close valve 17. This operation permits the idling system to operate on liquid fuel only from the low speed system.

Due to the fact that when on/off valve 2 is in the on position the effectiveness of the fuel air adjustment for proper fuel/air ratios and smooth running becomes non-functional because of a lack of liquid fuel, it is important to control the volume of the fuel vapors supplied to the engine intake manifold 33 through the carburetor 14 for smooth running when the throttle plate is closed. For this purpose, a line 61 is connected between lines 20 and 18A. A valve 60 in line 61 is used to adjust the pressure in line 18A. Opening valve 60 reduces the pressure in line 18A when the on/off valve 2 is in the on position, while closing valve 60 increases the pressure in line 18A. Thus, by adjusting valve 60 a sufficient pressure can be provided in line 18A to cause a cessation of liquid fuel flow in the idle passage of carburetor 14. Another valve 64 is located in line 20 between the check valve 12 and line 61. Valve 64 controls the required amounts of vapors for the desired idle speed and smooth running. This valve 64 is important because the idle speed screw on carburetor 14 has a fixed setting to correspond to the fuel requirement for smooth running, and this setting is not changed or adjusted. It is important that the conventional low speed idling system function properly to warm up the engine so that sufficient fuel vapors are produced for the proper operation of the vapor injection system according to the present invention.

From the foregoing description, it will be appreciated that the on/off valves 1 and 2 are used to control the high and low speed vapor injection systems in this particular implementation. In the prototype actually built, the on/off valves 1 and 2 are mounted on the dash board of the automobile to facilitate easy manual operation. Obviously, in a commercial embodiment, these valves could be advantageously controlled electrically and automatically. It is of note, however, that on/off valves 1 and 2 can operate independently of each other so that several modes of operation are possible. For example, with on/off valve 1 on and on/off valve 2 off, the engine will run on vapors but idle with liquid fuel supplied through the low speed metering system of carburetor 14. With both on/off valves 1 and 2 on, the engine will run entirely on vapors, and on the contrary, with both valves off, the engine will run entirely on liquid fuel supplied by the carburetor 14 in a conventional manner. It is even possible to have the engine idle on vapors and run on liquid fuel by turning on/off valve 1 off and on/off valve 2 on.

Figure 2:
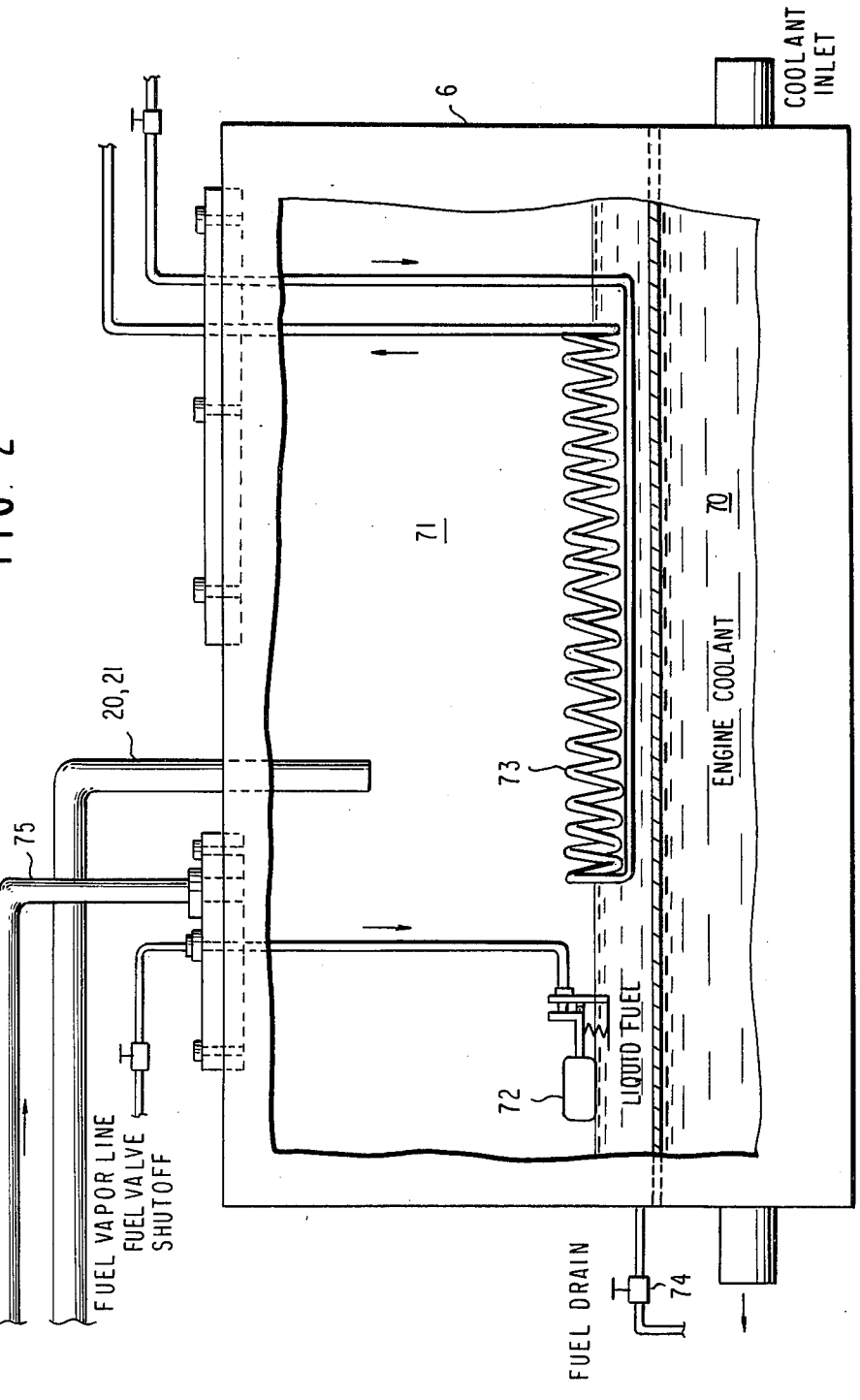
FIG. 2 is a cross-sectional view of a fuel heater tank used in the fuel injections system shown in FIG. 1.

The fuel vapors are produced in fuel heater tanks. FIG. 1 shows three heater tanks 6 connected in series and one tank 36 located at the rear of the automobile adjacent to the fuel supply tank 34. As shown in FIG. 2, fuel is heated by engine coolant being circulated through the tank 6 which contains liquid fuel. The bottom of the tank 6 has a compartment 70 through which the coolant circulates under pressure of the water pump (not shown) of the engine. Above this compartment is another compartment 71 where the liquid fuel is admitted by means of a conventional float valve assembly 72 to a level such that the liquid fuel occupies approximately 30% of the volume of the upper compartment 71 of the tank 6. A copper coil 73 is immersed in the liquid fuel, and engine coolant is circulated through the coil to give additional heat transfer to the liquid fuel to enhance vaporization of the liquid fuel. The fuel is supplied to the float valve by the engine fuel pump (not shown), and a drain valve 74 is provided for removing fuel from the tank for servicing.

The air space above the liquid fuel is pressurized by air pumped from cylinders no. 5 and/or no. 8 of the engine via line 75. As will become clear from the description of FIG. 3, these two cylinders are isolated from the remaining cylinders and are used to pump air in order to pressurize the fuel vapor injection system. The two air cylinders receive air through an air venturi 13 (see FIG. 1) and develop a low pressure in the isolated intake manifold. Air lines are connected at the spark plug openings of the air cylinders, and air is pumped into the fuel heater tank or tanks. The air pressure is controlled by an air pressure regulator (50 shown in FIG. 1) to maintain a precise air pressure in the fuel heater tanks. It is necessary to pressurize the fuel heater tanks because with an increase in speed and load, the pressure increases in the intake manifold which must be overcome in order to deliver the fuel vapors from the heater tanks to the intake manifold.

Referring again to FIG. 1, in order to increase the vapor flow into the intake manifold through valves 3 and 5, a fuel heater tank 36 is located in the trunk space in series with the fuel storage tank 34 and the intake manifold. In the prototype implementation, heater tank 36 only has copper coils immersed in the liquid fuel for providing heat transfer to the fuel with the lines 39 and 40 carrying the engine coolant. Since the heater tank 36 is at a higher level than the fuel supply tank, a spill pipe 48 normally allows fuel vapors in the supply tank to enter the heater tank and to drain excess fuel back into the supply tank. A pipe 45 bypasses volume vapor tank 35 so as not to have a build up of liquid fuel to prevent flow of vapors. Excess liquid fuel flowing back into the supply tank 34 with fuel vapors flowing in the opposite direction has the beneficial effect of enhancing the production of fuel vapors.

Figure 3:
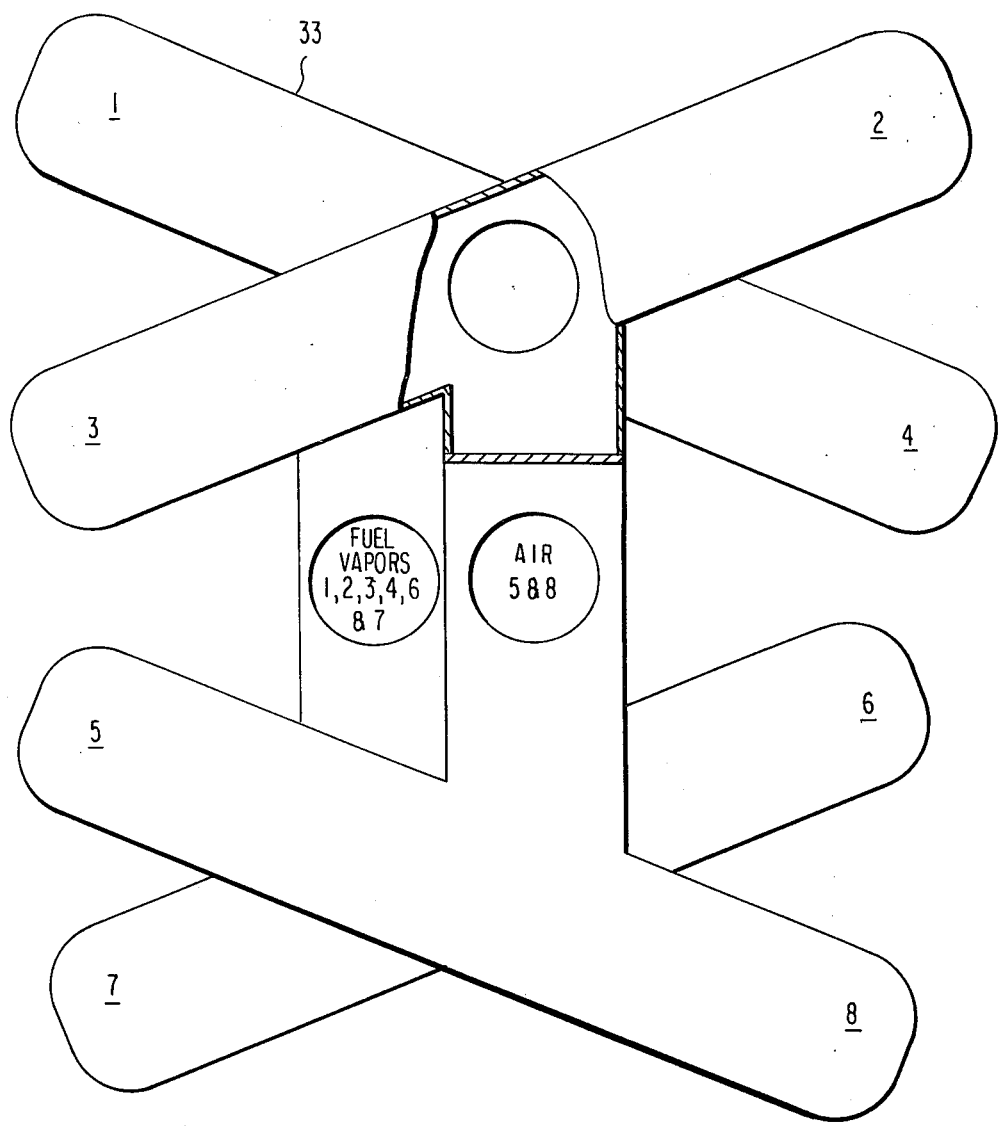
FIG. 3 is a plan view of the modified intake manifold used to convert a V8 engine to a balanced V6 engine in the system as actually built.

The modified intake manifold is shown in FIG. 3. This manifold is typical of conventional V8 engines having two levels. Normally the upper level communicates with the right barrel of a two barrel carburetor and supplies inboard cylinders no. 3 and no. 5 on the left bank of the engine and outboard cylinders no. 2 and no. 8 on the right bank of the engine. The lower level of the intake manifold communicates with the left barrel of the carburetor and supplies inboard cylinders no. 4 and no. 6 on the right bank of the engine and the outboard cylinders no. 1 and no. 7 of the left bank of the engine. This intake manifold is modified by welding a plate in the upper level of the intake manifold to isolate cylinders no. 5 and no. 8 from cylinders no. 2 and no. 3. This plate is located so that cylinders no. 2 and no. 3 are blocked from the opening to which the right barrel of the two barrel carburetor is normally attached. Therefore, in order to supply air to cylinders no. 2 and no. 3, a hole is cut through the interior of that portion of the manifold structure that separates the upper passage between cylinders no. 2 and no. 3 from the passage between cylinders no. 1 and no. 4. In the prototype, the two barrel carburetor which would normally be attached to this manifold is replaced by a single barrel carburetor attached to the left opening of the manifold.

Figure 4A:
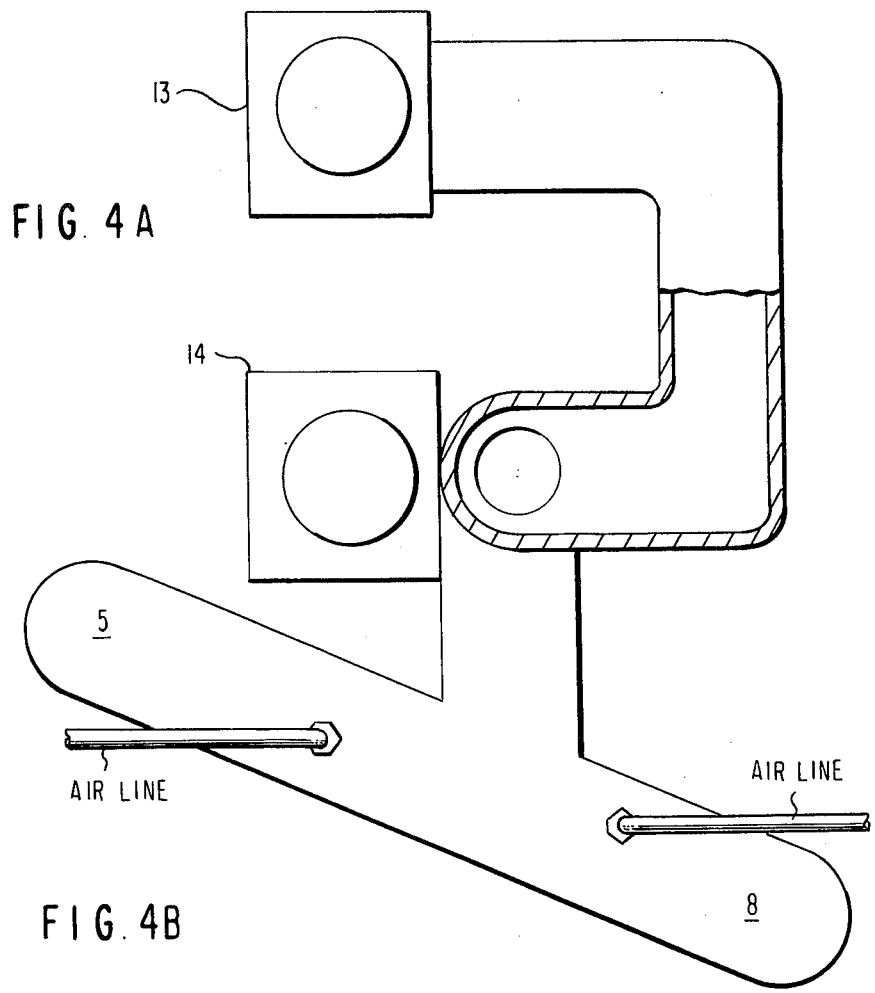
FIGS. 4A and 4B illustrate details of the air intake for the fuel injection system.
Figure 4B:
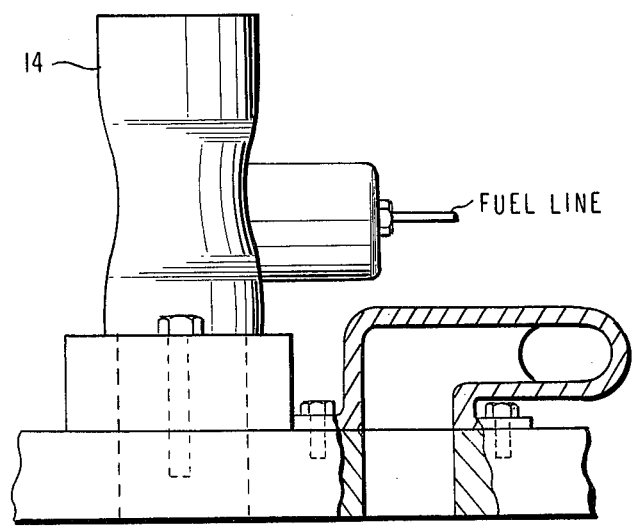

FIGS. 4A and 4B show this arrangement in more detail. The air venturi structure for cylinders no. 5 and no. 8 is simply a single barrel carburetor with the float bowl removed leaving the venturi and throttle valve. This structure is located to the front of the single barrel carburetor supplying the other six cylinders and the two throttle valves are connected together with a connecting rod. Air from the front venturi structure is conducted to the right opening in the intake manifold by a specially fabricated intake duct of low profile. Nevertheless, a spacer block is necessary to raise the rear single barrel carburetor in order to avoid interference with the float bowl of the carburetor. The throttle valve for the supply of air to cylinders no. 5 and no. 8 is necessary in order to reduce air flow and keep low pressure in the isolated intake manifold for cooling the engine. The throttle valve also reduces noise due to turbulent air flow through the venturi structure. In addition, the opening in the isolated intake manifold is reduced in size from the opening of the venturi structure to further aid in keeping a lower pressure in the isolated intake manifold supplying cylinders no. 5 and no. 8. While this description has assumed that both of the cylinders no. 5 and no. 8 would be used to pressurize the heater tanks, this is in fact not necessary as only one of these cylinders is capable of providing sufficient pressurization. The actual implementation of the invention uses only cylinder no. 8 to pressurize the heater tanks. The cylinder no. 5 air pump is used to supply air to an exhaust gas after burner and catalyst bed in order to more fully oxidize unburned hydrocarbons.

Figure 5:
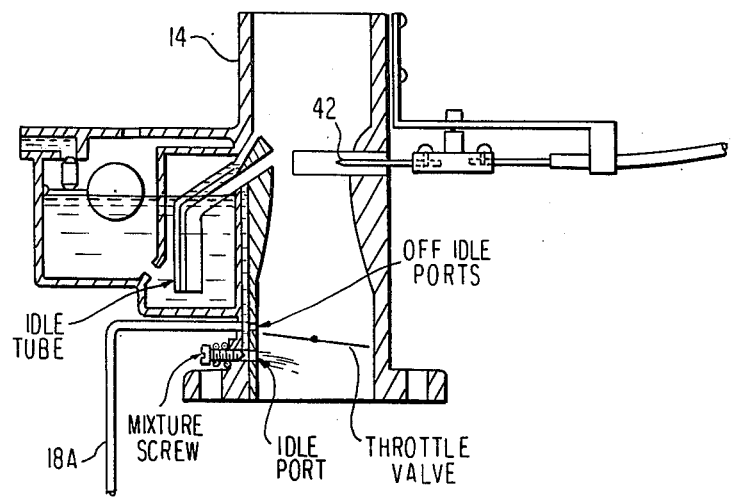
FIG. 5 is a cross-sectional view of a carburetor modified to provide smooth idling in the actually built fuel injection system according to the invention.

FIG. 5 shows a cross-section of the single barrel carburetor that is modified and attached to the left opening of the intake manifold shown in FIG. 3. In most carburetors, the idle system will continue to feed fuel even up to speeds as high as 70 mph. The line 18A from valve 17 intersects the idling system fuel/air conduit, and when valve 17 is opened by acutator 25, the pressure in this conduit is increased because of the air supplied by line 18. This reduces the flow of liquid fuel through the idling passage from the float bowl. The flow of liquid fuel in the low speed idle system is needed only when the engine is cold and therefore not supplying the fuel vapors needed to maintain the operation of the engine. Once the engine has attained normal operating temperature, the on/off valve 2 is turned to the on position. For similar reasons, a liquid fuel shut off for the venturi discharge tube is provided. This shut off is controlled in the prototype by a bouden wire operated by means of a push/pull button mounted on the dash board of the automobile. By varying the position of the pin 42 in the discharge tube, it is possible to supply a limited quantity of liquid fuel from the carburetor if needed under severe load conditions. Again, in a commercial version, the liquid fuel shut off valve most advantageously would be operated electrically and automatically.

The prototype described has evolved from empirical testing and while a commercial implementation may vary from this prototype as mentioned in the description, those skilled in the art will appreciate the inherent simplicity and economy of the fuel injection system according to the invention. Obviously, the invention is not limited to use on V8 type engines or engines in which one or more cylinders are dedicated to pumping air for the purpose of pressurizing the fuel injection system. Small engines having perhaps three, four, five or six cylinders in either in line or V configuration would benefit from the fuel injection system. What is required is a fuel heater tank to produce fuel vapors, an air pump to pressurize the fuel heater tank, and a valving mechanism for controllably supplying the fuel vapors to nozzles located in the intake manifold at positions as close to the intake valve as possible. The carburetor used in the prototype is used only for cold engine operation or under conditions of extreme load. This latter feature could be omitted entirely, particularly where fuel economy is the overriding consideration.

I claim:

1. A fuel injection system for a spark ignition multicylinder internal combustion engine having an intake manifold having mounted thereon a throttle body venturi including a low speed metering system and a liquid fuel float bowl supplied with liquid fuel, said throttle body venturi supplying air to the intake valves of each cylinder via said intake manifold, said fuel injection system comprising:

liquid fuel heating means for generating a supply of fuel vapors;

pressurizing means driven by said internal combustion engine and connected to said fuel heating means for pressurizing said supply of fuel vapors;

nozzle means in said intake manifold adjacent each of said intake valves for supplying fuel vapors to each cylinder of said multicylinder internal combustion engine;

first valve actuator means responsive to throttle body venturi pressure and connected between said pressurized supply of fuel vapors and said nozzle means for controlling the flow of fuel vapors to said nozzle means;

second valve actuator means responsive to intake manifold pressure and connected between said pressurized supply of fuel vapors and said nozzle means and also connected between said low speed metering system and said liquid fuel float bowl for controlling the flow of fuel vapors to said nozzle means and controlling the flow of liquid fuel through the low speed metering system; and control means connected to each of said first and second valve actuator means for selectively rendering said first and second valve actuator means operative or inoperative, whereby said first and second valve actuator means respectively control the high and low speed injection of fuel vapors and when said second valve actuator means is rendered inoperative by said control means, liquid fuel is supplied by said low speed metering system thereby facilitating starting and warm up of said internal combustion engine until sufficient fuel vapors are generated by said liquid fuel heating means to permit smooth running of said engine.

2. A fuel injection system as recited in claim 1 wherein said low speed metering system includes liquid fuel shut off means operated by said control means when said second valve actuator means is rendered operative.

3. The fuel injection system as recited in claim 1 wherein said fuel heating means comprises:

a tank into which a predetermined level of liquid fuel is introduced leaving a substantial volume in said tank for the accumulation of fuel vapors; and heater means attached to said tank for heating said liquid fuel.

4. The fuel injection system as recited in claim 3 wherein said heater means includes engine coolant circulation means for heat exchange between the engine coolant and the liquid fuel.

5. The fuel injection system as recited in claim 3 wherein said pressurizing means comprises an air pump driven by said internal combustion engine and connected to said tank.

* * * * *